United States Patent [19]
Deal et al.

[11] Patent Number: 5,758,961
[45] Date of Patent: Jun. 2, 1998

[54] METHOD FOR CONTINUOUS MIXING OF RUBBER

[75] Inventors: Michel Deal, St. Remy en Rollat; Daniel Laurent, Meylan, both of France

[73] Assignee: Sedepro, Paris, France

[21] Appl. No.: 787,133

[22] Filed: Jan. 22, 1997

Related U.S. Application Data

[62] Division of Ser. No. 574,983, Dec. 19, 1995, Pat. No. 5,626,420, which is a continuation of Ser. No. 161,783, Dec. 2, 1993.

[30] Foreign Application Priority Data

Dec. 7, 1992 [FR] France .................... 92 14890

[51] Int. Cl.⁶ ........................................ B29B 7/24
[52] U.S. Cl. ........................ 366/76.1; 366/69; 366/348
[58] Field of Search ................ 366/69, 76.1, 76.2, 366/76.3, 76.6, 76.7, 76.8, 76.93, 79, 97, 144, 148, 150.1, 153.1, 162.3, 182.1, 182.2, 348

[56] References Cited

U.S. PATENT DOCUMENTS

| | | |
|---|---|---|
| 2,733,051 | 8/1956 | Street . |
| 2,847,196 | 8/1958 | Franklin et al. . |
| 3,392,962 | 7/1968 | Fritsch ............... 366/83 |
| 3,920,223 | 11/1975 | Krueger ............. 366/177 |
| 4,194,842 | 3/1980 | Puthawala .......... 366/182 |
| 4,512,664 | 4/1985 | Oiwa ................... 366/76 |
| 4,779,989 | 10/1988 | Barr .................... 366/88 |
| 5,045,325 | 9/1991 | Lesko .................. 366/83 |
| 5,158,725 | 10/1992 | Handa et al. . |
| 5,358,693 | 10/1994 | Brinkman . |

FOREIGN PATENT DOCUMENTS

| | | |
|---|---|---|
| 0490056 | 6/1992 | European Pat. Off. . |
| 7118631 | 10/1968 | Japan .................. 425/208 |
| 974822 | 11/1964 | United Kingdom . |

*Primary Examiner*—Tony G. Soohoo
*Attorney, Agent, or Firm*—Baker & Botts, L.L.P.

[57] ABSTRACT

The continuous mixing apparatus for preparing a rubber composition has a mixing chamber accommodating at least one rotor rotating in a stator and extending between an upstream end and a downstream end between which the material progressively passes. The base elastomers are introduced at the upstream end of the mixing chamber by means of volumetric pumps capable of delivering the said base polymers under pressure. It has members for the dosaging and forced introduction of the other components, to arranged along the mixing chamber at at least two longitudinally separated positions between the upstream end and the downstream end.

18 Claims, 5 Drawing Sheets

METHOD FOR CONTINUOUS MIXING OF RUBBER

This application is a division of application Ser. No. 08/574,983, filed Dec. 19, 1995, now U.S. Pat. No. 5,626,420 which is a continuation of application Ser. No. 08/161,783, filed Dec. 2, 1993 (now abandoned).

BACKGROUND OF THE INVENTION

The present invention relates to the mixing of rubbers, and more specifically to the continuous mixing of rubbers.

In the rubber industry, the still very widely employed technique at the present time for mixing calls upon the use of internal mixers. This technique is carried out fundamentally batchwise; in order to produce a given amount of a rubber composition, one first of all weighs out the different components which are to constitute this composition and then introduces these components, or at least some of them, into an internal mixer, which assures the dispersing and mechanical work necessary in order to make the final mixture obtained as homogeneous as possible. The production of a composition, at times also called a mix, may require several successive passages through an internal mixer or different internal mixers, and may also utilize cylinder mixers.

All the operations mentioned above are independent operations. Continuous work, if it exists, is present only in the subsequent stage of production, at the time of the extrusion of semifinished products, such as, for instance, a tread or a sidewall, or a filler to be placed on a bead wire.

The replacement of discontinuous methods by a continuous method has been the object of extensive research and has remained a constant goal for a very long time for the conversion industries, the drawbacks of the discontinuous systems being so great. Despite this, no satisfactory method for the preparation of rubber compositions has been proposed up to the present time. A rubber composition is considered prepared if it contains all the intended components, including the vulcanization system, and if the rubber mass obtained can be used directly in an extrusion or molding step followed by a vulcanization step.

The failure of the continuous preparation methods seems to be due to the fact that the mixing of rubber is much more difficult than the mixing of other materials, such as plastics. The properties of the final composition depend, in fact, not only on the components contained in a composition but also on the manner in which the mixing has been effected, that is to say, they also depend on the mechanical work to which the mix is subjected while the mixing is effected.

The continuous mixing methods which are already known in general call upon the mixing effect of extruder screws. Numerous variants of screw extruders have been proposed—extruders with one screw, extruders with several screws in parallel or not in parallel, as well as numerous variants of screws for which a large number of shapes have been designed in order to obtain a good mixing effect and/or sufficient mechanical work.

It is known that for a rubber mix, the dosaging of the different front base components must be very precise. This precise dosaging does not raise any particular problem when one proceeds by successive batches, that is to say, in batchwise processes. On the other hand, when it is a question of proposing continuous mixing, it is indispensable to be able to effect the necessary dosaging of the different ingredients continuously. Furthermore, in the case of powdered products, in addition to the difficulty of dosaging, there is the difficulty of transporting the products, particularly downstream of the dosaging.

Generally, dosaging units deposit the necessary ingredients at regular intervals on a belt conveyor which feeds the mixing unit or units proper. A recent attempt to make the mixing of rubber continuous is described in an article published in the "European Rubber Journal" for March, 1987, entitled: "A Tale of Continuous Development".

This continuous mixing process, already proposed in the prior art, effects the dosaging of components by weighing and then effects the introduction of different components into apparatus which effect a premixing, this being done at different places in the mixing chain. This, therefore, makes it necessary to install numerous separate apparatus, each carrying out a very precise function—weighing, conveying, premixing. It is only then that the different components can be introduced by gravity into feed wells, for instance in a mixer of the type described in patent application EP 0 490 056.

No continuous mixing process proposed in the prior art has succeeded in gaining acceptance in the rubber industry. The reasons for this are insufficient mixing action due to the difficulty of mixing the rubbers using the screw mixer technique and extremely great complexity of the dosaging of the components when it is necessary to effect it continuously. In short, the methods of continuous preparation have never yet made it possible to achieve the properties which are expected on the part of the final mix, and are even incapable of formulating the rubber composition with sufficient precision.

It is known that in order to obtain good mixing it is necessary to cause random movements of the components, that is to say, to cause a certain chaos. When this mixer is of the continuous type, such as, for instance, that of the aforesaid patent EP 0 490 056, it is necessary furthermore that the local flow be substantially constant within the mixer. This means that the more one strives to optimize the action of the mixing, the greater the risk of the appearance of instabilities in flow, which are incompatible with strict compliance with the proportions of the different components.

SUMMARY OF THE INVENTION

The object of the present invention is to succeed in continuously effecting a dosaging of the base components present in any type of rubber composition, and then a complete mixing which makes it possible to obtain all the characteristics which are desired for the final mix.

Another object of the invention is to use the raw materials with as little prior conditioning as possible, particularly for the components used in very large amount such as the base elastomers and the reinforcing fillers. The object of the invention is therefore to provide a mixing apparatus into which the said components specifically referred to above can be introduced as easily as possible without any prior dosaging, and which can treat these components entirely independently and continuously in order to obtain the desired composition.

Another object of the invention is to improve the uniformity of the rubber compositions prepared and its constancy in time, while decreasing the cost of manufacture.

According to the invention, the method for the continuous preparation of a rubber composition consists in using at least one mixing chamber formed of a stator in which at least one rotor rotates, its rotation assuring both the advance from upstream to downstream (in the general direction of the axis of the rotor or rotors) of the components of the composition and their progressive mixing; it consists in continuously dosaging and introducing the base elastomer or elastomers of the mixture, continuously dosaging and introducing all the other components of the composition, advancing within the mixing chamber the components which have been introduced therein along zones of propulsion and mixing, while assuring that the filling rate of the mixing chamber in at least certain mixing zones is less than 1.

When the volume of the mixing chamber is completely occupied by the components to be mixed, it is understood by convention that the filling rate of the mixing chamber is equal to 1. When the volume of the components mixed is less than the volume available in the mixing chamber, as is typically the case for the operation of internal mixers, it is then understood that the filling rate is less than 1.

It has been found in fact that, even for a continuous mixer, it is desirable that there be an empty space within the mixing chamber in order for the dispersing and homogenizing action of the mixture to be perfect; that is to say that there be at least certain zones of the mixing chamber in which the filling rate is less than 1. This depends on the nature of the components to be mixed and is verified by experimental observation. In the prior art, the importance of this parameter seems not to have been sufficiently understood. When using screws turning in sleeves for mixing, the space present between screw and sleeve was allowed to fill up or no special measure was taken to control this parameter.

It is possible to produce zones which are different from each other within one and the same mixing chamber by selecting different shapes of tools, that is to say by selecting the shape of the surface of the rotor and of the inner surface of the stator.

It is these different shapes of tools which provide assurance that, taking into account the flow at a given point of the mixing chamber, which, in its turn, depends on the flow delivered by the upstream dosaging and introduction members, the filling rate is less than 1 or reaches 1. Stated differently, within the mixing chamber, there are propulsion zones and compression zones for the material—that is to say, zones in which the action of propulsion of the mixture is less—so that the mixing chamber tends to fill up and to remain filled along these zones.

When selecting the shapes of tools, one assures the transport of the material along the entire mixing chamber while controlling the rate of filling of the chamber. One can also control the rate of filling of the chamber by acting on the temperature of the wall of the chamber. This modifies the sticking of the rubber to the metal.

In order to have assurance that the components of the formula are introduced properly into the mixer in precise and uniform quantities, it is preferable that most of them be introduced positively and definitely into the inside of the chamber. For this reason, one avoids gravity incorporation, particularly in the event that a fraction of the components might not reach the inside of the chamber. In order to provide assurance, by control of the mixing process, that all the components contemplated are actually part of the composition produced, it is desirable that, after the dosaging, the components remain contained within a confined enclosure, for instance a pipeline, until they reach the mixing chamber. Volumetric pumping lends itself particularly well to a forced introduction of the components.

It has been found that volumetric pumping furthermore makes it possible to plasticize the elastomers sufficiently. The latter are thus introduced hot (typically at a temperature above 40° C.) into the mixing chamber, in a condition which permits rapid incorporation of the carbon black or other powdered fillers.

In order to obtain a very precise dosaging of the different components of the rubber mix, it may be desirable, depending on the elastomers and/or fillers and/or additives used, to add that at the place where components are added downstream of the first mixing zone, the filling rate within the mixing chamber is equal to 1, since otherwise flow in the chamber may be variable and the proportions of components would not be respected. As an alternative, or in addition in order better to assure a precise dosaging, it may be advisable to assure the flow at this place by effecting a volumetric boosting of the flow of the material which has arrived just in front of this point of introduction. By "volumetric boosting" there is understood a new volumetric dosaging of the amount of material mixed.

However, cases have been observed in which great stability of the rate of flow is obtained more easily with a rate of filling of the chamber continuously less than 1 or even far less than 1. This makes it possible to avoid recompacting the material before the addition of a further component.

The concept of continuous mixing proposed by the present invention makes it possible to reconcile these contradictory requirements (rigorous and constant respect of the formula of the mix and therefore of the relative proportions of each component, and rate less than 1 favorable for a good mixing).

In accordance with another aspect of the invention after the dosaging of the components or some of them, an empty space is created within the mixing chamber by accelerating the transport of the components or by increasing the passage section, and then decreasing the propulsion effect caused by the rotation of the rotor by changing the shape of the rotor and/or of the stator or by decreasing the section or passage or by controlling the wall temperature for the introduction of other components, depending on the rubber composition to be produced. We may note here that by "empty space" there is understood the fact that the volume of the mixing chamber is not completely occupied by the components injected, which has nothing to do with the vacuum which it may be desirable to provide at several places along the mixing chamber for purposes of degasification, as is well known per se.

Thus, in accordance with one very interesting variant of the method of mixing in accordance with the invention, at least a part of the base elastomers and the reinforcing fillers are introduced in a zone upstream of the chamber, are then mixed in a first mixing zone located just downstream, then arrive at a point of introduction where the other components are introduced, the entire quantity being mixed in a second mixing zone. One can either introduce all of the base elastomers at the upstream point of the mixing chamber or introduce only a part thereof and introduce the other part of one or more base elastomers further away, that is to say, at a point shifted downstream, for instance in front of the second mixing zone.

The invention also proposes a continuous mixing apparatus which is particularly designed to carry out the method described but which may have broader applications, for instance if the level of precision expected for the composition and the level of the performances required is not as great.

A continuous mixing apparatus for preparing a rubber composition has a mixing chamber comprising at least one rotor rotating in a stator and extending between an upstream end and a downstream end between which the material progressively passes, at least one component of the composition being introduced at said upstream end of the mixing chamber, the rubber composition being expelled from the downstream end; it has dosaging and forced introduction means for the base elastomer or elastomers which are capable of delivering the said base elastomer or elastomers under pressure so as to introduce them into the mixing chamber, and it has dosaging and introduction members for the other components, all of the dosaging and introduction members debauching into the mixing chamber at at least two points, spaced apart longitudinally between the upstream end and the downstream end.

The mixing apparatus described below comprises a single rotor in a stator. This means that there is concerned a mixer of the single screw type and not a mixer with two parallel screws turning in the same chamber. This does not exclude the apparatus having, in succession, two or more screws each turning in its individual sleeve; however; in a given chamber, there is only one screw. Here also, contrary to what appears in the state of the art in the field of the mixing of rubber, in which the continuous mixers recently proposed use two rotors rotating in a stator, the objectives assigned to the invention are surprisingly obtained by using a single rotor over the entire length of the stator or stators used. For this reason, the invention also extends to a method of mixing in which a single rotor rotating within a stator is used.

The stator in which the rotor turns is a purely cylindrical sleeve, or else a sleeve the surface of which also has a shape specifically designed to contribute to the mixing or propelling action in cooperation with the shape of the rotor.

Upon examining the mixing chamber, one distinguishes, along the chamber, different successive zones depending on the shape of the surface of the rotor and of the stator— mixing zones and propulsion zones. In a given zone, it is the combination of the shape of the radially inner wall of the stator and of the shape of the radially outer wall of the rotor which characterizes the mixing chamber. The shape of the radially outer surface of the rotor and of the radially inner surface of the stator assures a filling rate of the mixing member of less than one in at least certain regions of the mixing chamber.

The mixing action will be due primarily to the randomness which one succeeds in bringing about in the flow of the material by any particular shape which is imparted to the surface of the rotor and/or to the surface of the stator— cavity, obstacle, smearing and rolling of the material between the crests of threads arranged on the rotor and/or the stator and the opposite wall, shearing between stationary obstacles and movable obstacles. The gap, that is to say the distance between the fixed obstacles (of the stator) and the movable obstacles (of the rotor) is an important parameter which makes it possible to regulate the mixing action. This means that the designer of the mixer may vary the dimensioning of this gap in order to control the quality of the mixing as a function of the results obtained.

The propulsion of the material from the upstream end towards the downstream end of the mixing chamber is due primarily to the effect of a thread. This thread may be either provided on the rotary shaft or on the inner surface of the sleeve on one or both surfaces. It may be a true thread comparable to that of a rod threaded to receive a nut, or else "the thread" effect resulting from the twisting combined with translation of a closed line in order geometrically to define the wall of the stator or the rotor.

The propulsion of the material may also be due to the volumetric pumping upon the introduction of the components, or to a boosting by volumetric pumping during the transport of the material between the upstream end and the downstream end of the mixing chamber.

Preferably, just before introducing components into the mixing chamber, the region thereof is primarily a propulsion region (slight or no mixing action), formed, for instance, by a smooth cylindrical sleeve and a rotor having a thread of constant thickness extending perpendicular to the axis of the rotor.

The mixing apparatus preferably comprises, for a base elastomer, a volumetric pump within the dosaging and forced introduction member. Advantageously, all the base elastomers are introduced in the same way. It is very advantageous for the volumetric pump or pumps for elastomer to be fed by a plasticizing and stuffing member. With such a machine, in the event that the elastomers feeding the machine are conditioned as granules, it is not necessary to cover them with an antisticking agent.

While the prior art in general proposes dosaging practically all the components by weighing, it is proposed to use preferably dosaging by volumetric pumping for most of the components, and preferably all of them; including those which are in powder form, and in any event including the base elastomers.

Despite everything, some components may be difficult to dosage volumetrically and one may be forced to dosage them by weighing. In accordance with the invention, it is preferable to assure a forced introduction of all the components, that is to say not to rely on incorporation by gravity; after the dosaging of a certain amount, it is necessary to introduce it positively and definitely into the mixing chamber. When using volumetric pumps, it is not necessary to make the delivery of the components into the inside of the mixing chamber depend on a parameter determined, for instance, within the chamber, such as for instance, the pressure or the temperature.

In order to be able to assure strict compliance with narrow tolerances in the formula for the rubber composition prepared, it is desirable that the rate of filling be 1 at the places where the dosaging and forced introduction members introduce the components into the mixing chamber, except, of course, in the case of the component introduced first where the mastering of the flow depends only on the precision of the dosaging and introduction member itself. On the other hand, downstream, it is favorable to introduce the components in a zone where the filling rate is equal to 1, in order to assure that the relative proportions of the components are rigorously respected. In any event, downstream of a first mixing zone; in order to assure respect for the narrow tolerances in the formula of the composition, it is advisable to introduce other components into a zone where the filling rate is equal to 1 and/or to provide a boosting of the total flow by a volumetric pump.

If the components following the first are introduced at a place where the filling rate is less than 1, then rigorous respect for the formula of the mixture requires great stability of the flow within the mixing chamber in order that said rate be constant and identical at all points.

The following figures and the description relating to them will make it possible clearly to understand the invention and to note all the advantages thereof.

DESCRIPTION OF PREFERRED EMBODIMENTS

Figure 1:
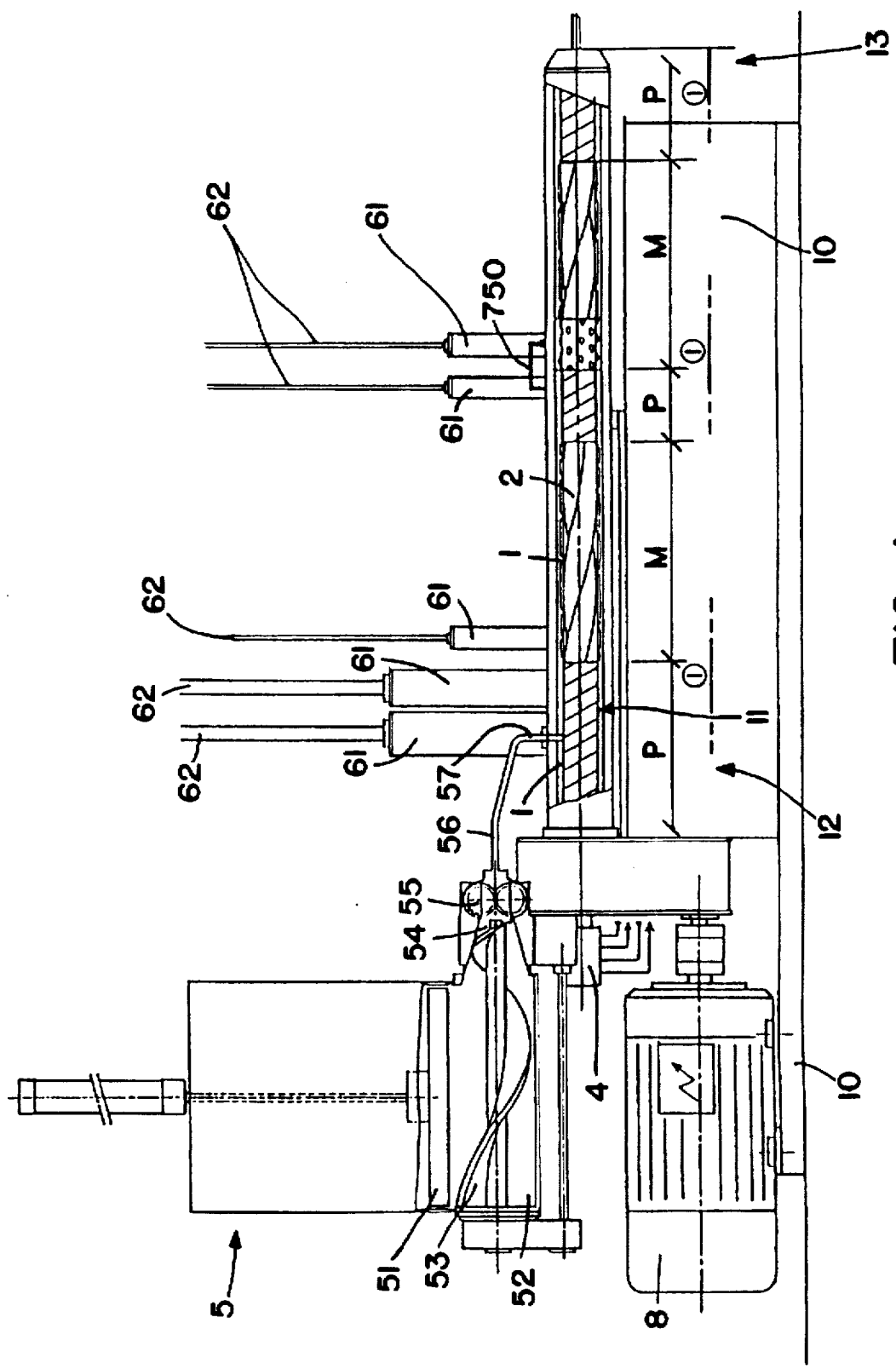
FIG. 1 is a view, in elevation, of a mixing apparatus according to the invention, having outside portions removed.

The mixing apparatus which is shown in the different figures comprises a mixing chamber 11 within which a rotor 2 rotates. The upstream side of the mixing chamber is indicated by the reference numeral 12 and the downstream side by the reference numeral 13.

On one side of the machine, there can be noted two hoppers 5 into which the base elastomers constituting the rubber mix are introduced. These hoppers are capable of containing at least one slab of elastomer in the form that it normally has upon delivery to the rubber-conversion industries. Of course, one can also introduce the elastomer or elastomers into the hopper in shredded form. A ram 51 can slide vertically within each hopper 5, from a raised position in which it emerges from the hopper 5 to a lowered position where it reaches the bottom of the hopper 5. The hopper communicates with an enclosure 52 in which a helically twisted knife 53 turns. This knife 53 constitutes a means for shredding the elastomers, producing chips from the slab or slabs of elastomer arranged in the hopper.

Thereupon, a volumetric pump is fed by a mechanical means assuring the transfer of the granules or chips. It is seen in this example that the pitch of the helix forming the knife 53 decreases progressively at 54 in order to add, to a shredding action which does not require the helical curvature, a transfer of the chips and a plasticizing action which is more and more intense upon movement towards the right in FIG. 1. The filling of a gear pump 55 is thus assured.

The gear pumps 55, which are volumetric pumps, are connected to pipelines 56 which come together in a single line 57 in order to feed the mixing chamber.

Figure 3:
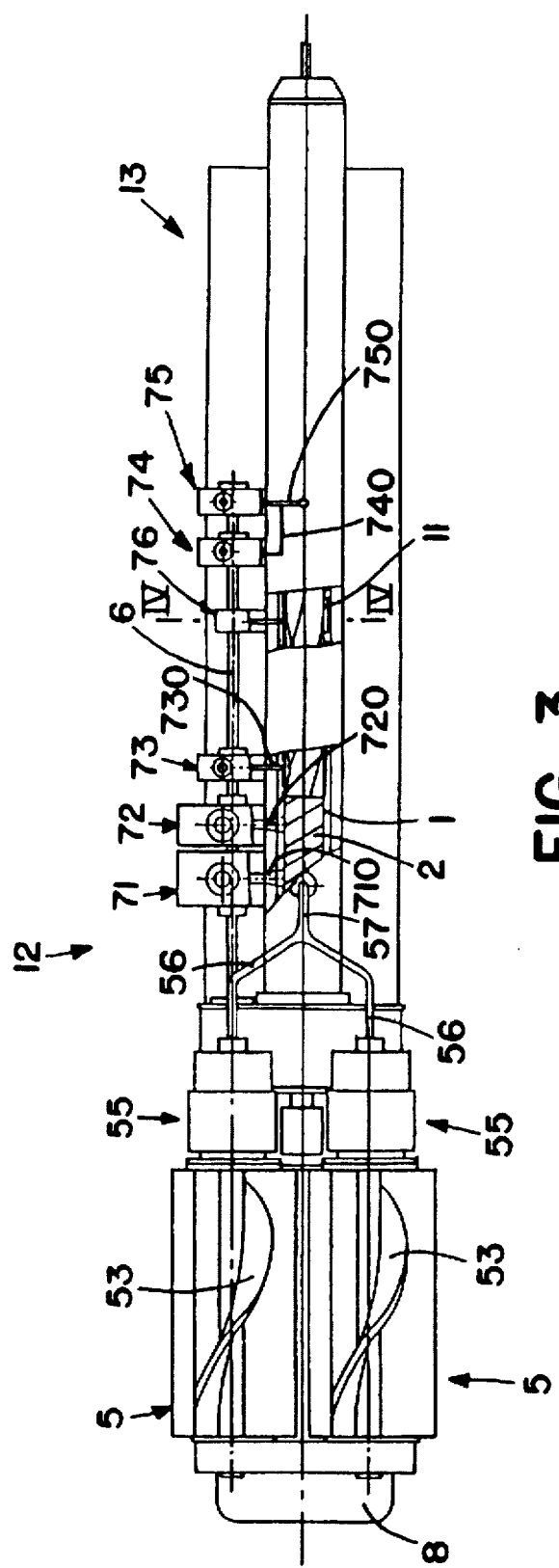
FIG. 3 is a plan view of the same mixing apparatus, having outside portions removed.

The removal of the outside portions in FIGS. 1 and 3 make it possible to note the inside of the mixing chamber 11. The latter is formed by the available volume between the rotor 2 and the stator 1.

Along the rotor 2 there can be noted three zones P which act essentially to advance the components of the mixture, and between which zones P there can be noted two separate zones M the action of which is essentially the mixing of the components. The introduction of the base elastomers is effected on the upstream side 12 of the mixing chamber into a propulsion zone P.

Other dosaging and introduction members are distributed along the mixing chamber and make it possible to introduce the other components of the final composition at, different places along the path of the base components. The powdered components are preferably introduced by a volumetric pump upstream of the first zone M. One can, for example, use the pump described in EP patent 0 465 981 or else a volumetric pump of the type described in EP patent 0 465 980 in the variant having a delivery piston. The liquid components can be introduced very easily with a volumetric pump for liquids which may be of the piston type or of any other type capable of assuring good volumetric precision, such as, for instance, a gear pump or a vane pump. The volumetric dosaging of the liquids does not raise any problem and the different means are well known in the prior art. They are introduced at the beginning of the first zone M.

The antioxidants, plasticizers, sulfur, and activators are advantageously premixed, alone or with a very small amount of oil (a few % of the quantity specified in the formula of the rubber composition), for instance, very simply, in a vat in which a helix turns. This operation imparts this mixture the form of a paste. If necessary, those of these products which are in solid phase at room temperature are first heated in order to liquefy them. This paste mixture, like any other possible paste component, is preferably introduced with a volumetric pump (gear pump or piston pump, for example). Effecting a premixing or, more precisely, a regrouping of components is particularly advantageous when there are a large number of components used, each in very small amount, in the formula of the mix in question, that is to say, each used in a proportion less than 10% of the total weight of elastomer. This leads to decreasing the number of dosaging members on the mixing apparatus. This premixing can be effected continuously or by successive batches. It is necessary, of course, to take into account any possible chemical incompatibilities when selecting the products which are thus combined.

In the example described, the dosaging and introduction members 71 and 72 are volumetric pumps for powdered products. The communication paths 710 and 720 between these pumps and the mixing chamber can be noted. The pump 73 permits a volumetric dosing and introduction under pressure, via the passage 730, of the oil used in the rubber mix.

Finally, the pumps 74 and 75 are used to introduce, via the conduits 740 and 750 respectively, an accelerator and all of the antioxidants, plasticizers and sulfur which have been premixed. The conduits 740 and 750 combine to form a single conduit 750 which leads the components to the mixing chamber 11. It is important that the mass flow of the second zone P be equal to the sum of the mass flows of all the dosaging and introduction members located upstream since if it were less, then the first zone M would become progressively filled in its entirety (filling rate of 1) and it could then no longer perform its role as mixing zone.

Even those volumetric pumps which by nature deliver a pulsating flow permit an overall continuous operation of the mixing apparatus if one selects a unit volumetric displacement which is sufficiently small as compared with the overall flow and the speed of flow.

The apparatus is equipped with at least one degasification device 76 located, as can be seen in FIG. 3, shortly in front of the pump 74, that is to say in a zone where the filling rate is less than 1. In FIG. 1, the zones where the filling rate is equal to 1 are indicated by lines parallel to the axis of the apparatus, opposite said zones, identified by the number 1 surrounded by a circle.

Figure 4:
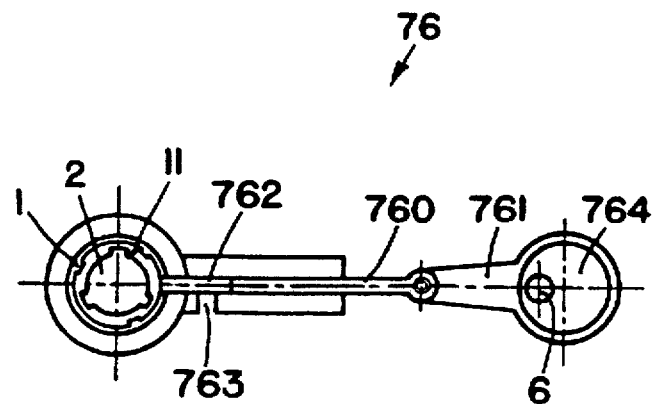
FIG. 4 is a section along the line IV—IV of FIG. 3.

In FIG. 4 it is seen that the degasification device 76 has an opening 763 to the atmosphere, drilled in a tube 762 which furthermore goes to the mixing chamber 11. The purpose thereof is to prevent the degasification allowing the material contained within the mixing chamber to escape at the same time.

For this purpose, a means is provided which, in succession, covers and then uncovers the said opening 763, repeating this cycle continuously. The air can therefore escape for a brief moment without the material having time to be entrained with the gas exhausted from the chamber 11. This is the role of the piston 760, driven via a connecting rod 761 by an eccentric mounted on the shaft 6. The unit is so regulated that, after having covered the opening 763, the piston 760 can push back into the chamber 11 the material which may have started to penetrate into the tube 762.

Figure 2:
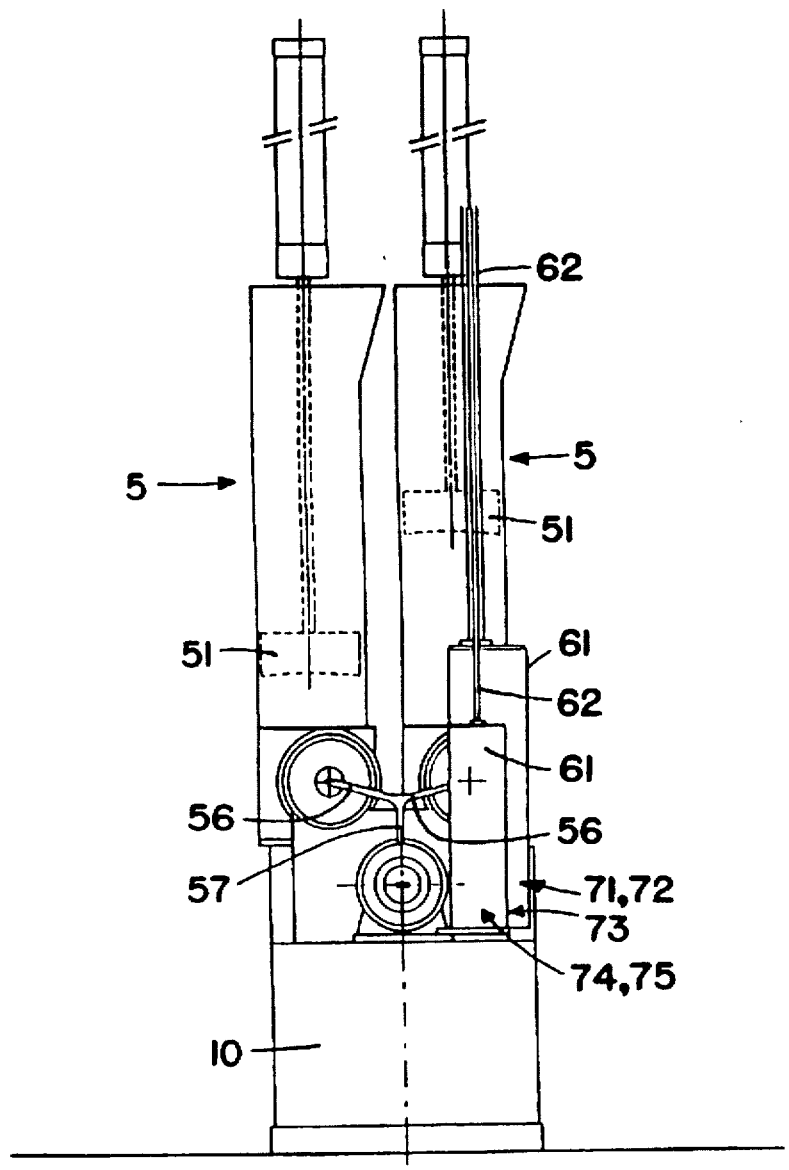
FIG. 2 is a side view of part of the same mixing apparatus.

Above the different pumps 71, 72, 73, 74, 75, there is seen (FIG. 2), for each component, a column in which there is a buffer reservoir 61, on top of which there is a feed tube 62. The tubes 62 are connected to a distribution network consisting of piping, possibly adjusted in temperature for the liquids, forwarding by the systems well known for powders (for instance pneumatic transport) or any other suitable system. A suitable device controls the level of the component in the buffer reservoirs 61 in order to maintain the filling of them between the minimum and maximum levels contemplated.

It can be seen (FIG. 1) that the mixing chamber comprises, from upstream to downstream, a zone where the filling rate is equal to 1 and then a zone in which the filling rate is less than 1. This results from the fact that components are introduced through the conduit 750 and therefore at this place, in order to guarantee full compliance with the composition to be produced, a stabilization of the flow is assured by reaching a filling rate of 1. Just in front of this, a propulsion zone P has therefore been provided.

The construction of the mixing apparatus is modular. It can be seen that, in the variant illustrating the invention, it comprises two mixing stages. Depending on the difficulty in effecting the mixing of rubber, one or more mixing stages can be used, all of which will be formed in the same manner: They will comprise a single propulsion zone and then one or more mixing zones. In order to form the different mixing elements, a tool-holder shaft is used on which tools selected as a function of the mixing performances to be obtained are mounted and locked by different keys.

It can be seen in FIG. 1 that for all the zones P the stator 1 is smooth and the rotor has a central propulsion screw, indicated diagrammatically in the drawings. It can also be seen that, for the first zone M and a part of the second zone M, the stator 1 has a thread of pitch opposite to the thread arranged on the rotor in zones P in order to contribute to the propulsion of the mixture, and the surface of the rotor is generated by a triangular section, helically twisted. Finally, it can be seen that for a small part of the second zone M, both the rotor and the stator have cavities of the type described in Patent WO 83/03222 or EP 48590.

However, we may point out that the knowledge with respect to the design of the shapes of the rotors and stators of mixing apparatus for rubber are rather empirical. It is necessary to proceed with experimental determinations. As to the shape of these mixing tools, the present invention requires only that they be selected so as to produce propulsion zones P and mixing zones M in such a manner that one has zones where the filling rate is less than 1 and separate material transfer zones where the filling rate may be equal to 1 (see the 1 surrounded by a circle in FIG. 1).

One very simple means of controlling the value of the effective filling rate of the mixing chamber within the different zones thereof consists in simultaneously stopping the rotation of the rotor and the operation of all the dosaging and introduction members and then removing the rotor from the stator, which entrains the material in place along the rotor. Once can then compare the volumes of material with the theoretical volumes in the different desired zones. The theoretical volume being that available between stator and rotor. A simple visual inspection of the rotor will generally make it possible immediately to see in what zones the rate of filling is less than 1.

This principle of modular construction easily permits optimizing of the mixer to the type of mix to be produced. However, it is possible to design a multivalent tool, even in the case of the single-rotor mixer.

Of course, the mixing apparatus comprises heat control by circulation of fluid within the rotor via the rotary joint 4 and by circulation of fluid in the stator, and even around conduits 55 and 56 and around the enclosure 52. It is advisable to be able to regulate in several separate zones, since the temperature values to be respected depend on the optimal viscosity which is desired for the mixing stage reached and also on the reactivity to temperature of the different components. For example, a vulcanization system may not be incorporated in a mix which would be at a temperature above the vulcanization temperature. Furthermore, control of the flow of the material along the wall and, in the final analysis, the quality of the mix produced depends on control of the exact temperature of the wall selectively in the different zones.

The mixing apparatus is driven as a whole by a single motor 8, which can be noted on the left-hand side of the frame 10. This motor drives in rotation the rotor 2 as well as a drive shaft 6 on which the dosaging and forced introduction members can be engaged or disengaged. Each dosaging and forced introduction member comprises an adjustment which makes it possible to vary the amount dosage for a given speed of the drive shaft 6.

In order to produce a rubber composition, one selects, as necessary, the type of tool which is to be mounted on the shaft and on the sleeve. Then, in order to obtain the desired composition, it is necessary to regulate the different flows with respect to each other by means of the flow controls associated with each dosaging member. The effecting mechanically of the regulations of flow can a priori be considered a constraint. However, this offers a greater assurance of compliance with the formula of the composition and its constancy in time. As these adjustments need be made only upon a chance of composition, this proves to be a very interesting solution. In the case of a piston pump, one can adjust the cylinder displacement thereof by modification of the stroke. One can also, for any type of pump, vary the step-down ratio installed between the drive shaft 6 and each of the pumps. In all cases, there is no individual regulation on the flows. The mixer is driven in its entirety by a single motor, which furnishes both the work necessary for the mixing and the moment of rotation absorbed by all the dosaging devices.

In another embodiment, each dosaging and introduction member has its own motor, or certain groups of members have their own motor, and the operation of all of the motors of the apparatus is controlled by a computer as a function of the data of the composition to be produced.

One interesting aspect of the continuous mixer proposed by the invention resides in the very great facility with which one can optimize the filling rate along its axis in order to take into account the very large decrease in the volume occupied by the elastomers and the powdered components as the powdered components are introduced into the elastomers. This is obtained by controlling the passage section of the material, defined by the surface contained between rotor and stator on a section perpendicular to the axis of the rotor, and/or the speed of flow.

Upon starting, one commences first of all by placing the shaft 2 in rotation by starting the motor and then engaging the volumetric pumps 55 assuring the introduction of the base elastomers. The simplest way is then to wait for the time necessary in order for the elastomer or elastomers to have arrived at the downstream end of the mixing chamber. Thereupon all the dosaging members 71, 72, 73, 74, and 75 are engaged simultaneously. Then, after the time of transit of the materials within the mixer, the exact final composition is obtained. The loss of material is extremely small as compared with the quantities produced. Upon the stopping of the manufacture of the mixture, the action of the dosaging members is stopped, apart from those metering one or more of the base elastomers, whereupon one or more of these base elastomers is allowed to pass through which may have the action of a cleaning gum. The injection pump or pumps of this or these elastomers is then stopped and the rotation of the shaft 2 is continued to assure as complete an emptying as possible of the mixing chamber.

During the operation of the mixer, each hopper 5 must, of course, always contain the desired base elastomer. In order to assure a uniform feeding of the apparatus, the ram 51 rests with a suitable form on the elastomer which the hopper contains. When the ram arrives at a position close to the bottom position, it can be raised and the top of the hopper completely freed in order to be able to introduce again one or more slabs. This is done in practice without any interruption in the actual feeding of the mixing chamber. Pellets of rubber can also be introduced into such a hopper, even without their being coated with antisticking agent.

Figure 5:
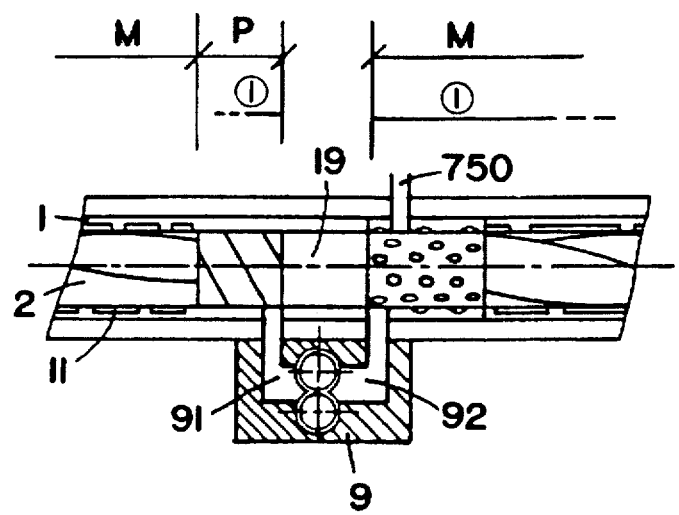
FIG. 5 is a side view of a variant embodiment.

FIG. 5 illustrates in part a variant of the mixing apparatus. A volumetric pump 9 is arranged along the chamber at at least one point of removal located between the upstream end and the downstream end, entire flow at the point of removal passing through said volumetric pump. This volumetric pump 9 is installed in such a manner as to effect a volumetric boosting of the entire flow passing through the apparatus, just before adding one or more other components of the mixture. This volumetric flow must be adjusted to respect the condition of equality of the mass rates of flow explained above. One can achieve this result by a suitable dimensioning of the said volumetric pump 9. One can also accurately control the speed by a regulation constructed on basis of two pressure sensors, one placed at the start of the zone P and the other at the end, just in front of the point of withdrawal, so that the volumetric pump 9 is not underfed nor its insufficient flow cause a filling of the mixing chamber in the upstream mixing zone. However, it is important to introduce only very small variations in speed of the volumetric pump 9 around its rated speed.

The rotor 2 has a smooth surface 19 fitted with functional clearance on the stator 1, so as in this way to produce a bearing which is tight with respect to the material mixed. This material passes through the connection 91, through the volumetric gear pump 9, and then through the delivery connection 92 which brings it into the mixing chamber 11, beyond the smooth surface 19. One can then note the conduit 750 debouching into the mixing chamber 11 at the beginning of the second zone M. It corresponds to a dosaging and forced introduction member situated just downstream of the said point of removal. The volumetric gear pump 9 is driven by the shaft 6 by means of a power take-off, not shown.

The invention can be used for all rubber compositions. The quality of the dispersion has been evaluated for a composition for a tire tread, vulcanizable with sulfur, having a base of SBR and polybutadiene, carbon black, zinc oxide, oil, and wax. Under an optical microscope, there can be noted the agglomerates present in a vulcanized thin skin made with this composition. These agglomerates correspond to defects in dispersion of the fillers.

Figure 6:
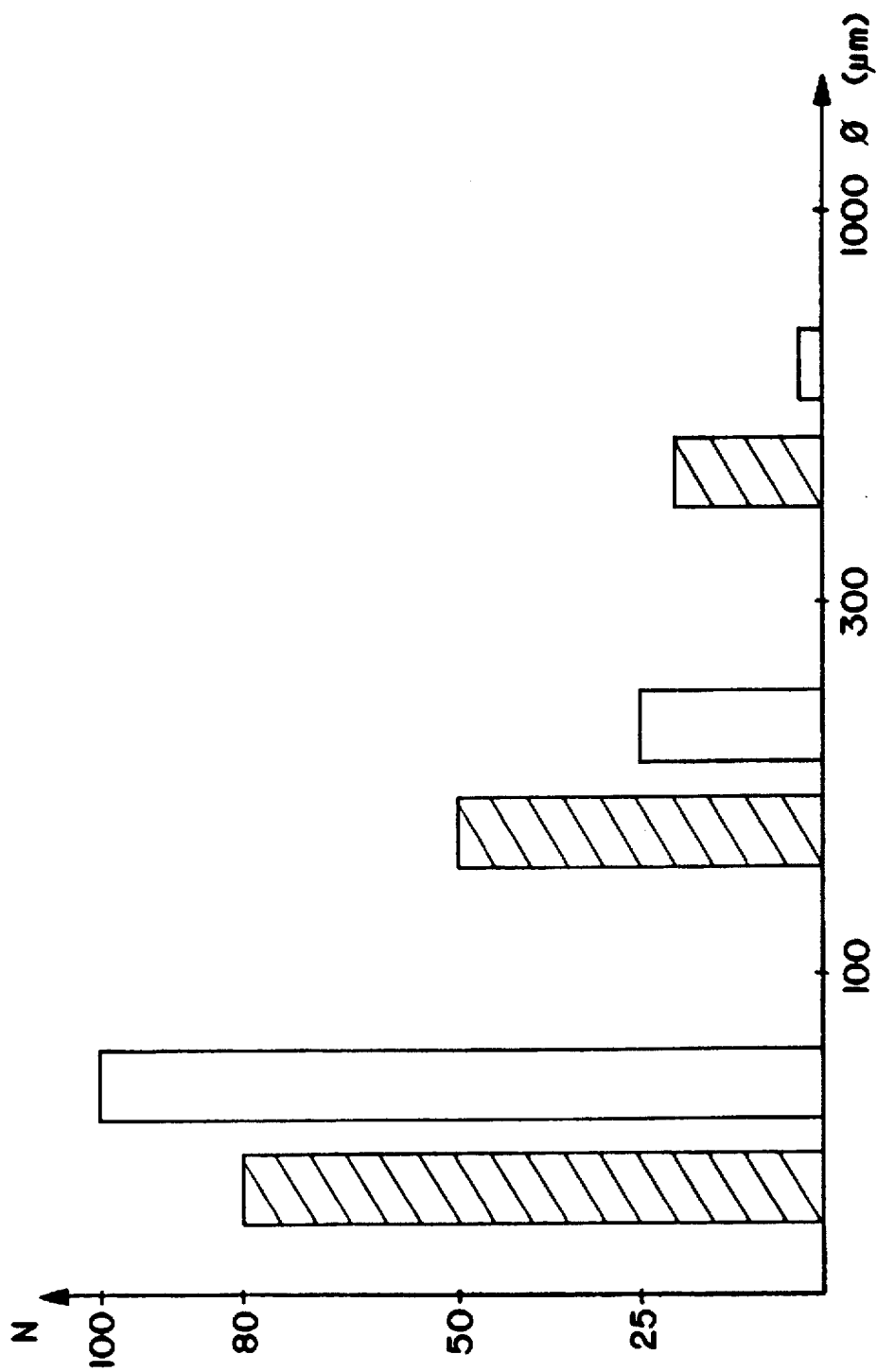
FIG. 6 is a chart which shows comparative results.

In the diagram of FIG. 6 there is shown on the abscissa the size of the agglomerates and on the ordinate their number. The results obtained for three ranges of agglomerate size, identical in the two tests are given. The composition produced on an internal mixer gives the result shown by the hatched bars. It is seen that the agglomerates which remain after mixing in accordance with the invention are of much smaller average size. Their larger number reveals a better dispersion action.

Referring to the Cabot test (see, for example, ASTM Standard D 2663), a mixture difficult to produce, having obtained a rating D3 after working in an internal mixer, obtains a rating C2 when using the present invention. A current mix, for which the rating C2 is obtained when using an internal mixer obtains the rating B1 when using the present invention.

It is seen that this very compact apparatus does not require any preliminary conditioning or dosaging of the heaviest components, namely the elastomers and the reinforcing fillers. It is capable of receiving the raw materials in crude state and delivers at its outlet a final mix which fully satisfies the composition formulated and its properties. In addition to the advantages of a continuous process, the quality of the mixes obtained is at least equal or even better than what is obtained on an internal mixer.

We claim:

1. The method of mixing a rubber composition having components including at least one base elastomer, at least one filler and other additives, comprising:

providing a mixing chamber defined between a stator and at least one rotor designed for rotation in the stator, the surfaces of the stator and the rotor functioning as tools arranged along the length of the mixing chamber, the surfaces of these tools serving as mechanical working surfaces which define between them a passage for the flow of the rubber composition, selecting the shape of the tools to change the effective section of the passage to define successive mixing zones in which the filling rate is less than 1, a filling rate of 1 for a zone being defined as a condition in which the volume of the chamber in the zone is completely filled by the components therein, continuously force-feeding the base elastomer at one end of the mixing chamber from the discharge of a volumetric pump and imparting heat to the base elastomer by mechanical working, continuously dosaging and introducing the filler and additive of the composition into the mixing chamber, and continuously rotating the at least one rotor to assure the propulsion through the mixing chamber from upstream to downstream, the mixing of the components and the discharge of the mixed composition.

2. A method according to claim 1, including preparing a rubber mix the formula of which comprises main components and several additive components, each additive component present in a proportion of less than 10% of the total weight of elastomer, and including effecting at least a premixing of at least some of said components so that a paste is obtained, which is then introduced into the mixing chamber in desired amount together with the other main components.

3. A method according to claim 2, used to prepare a mix the formula of which contains oil, characterized by the fact that a fraction of the amount of oil is used to effect the premixing.

4. A method according to claim 2, characterized by the fact that those of the said components present in solid phase at room temperature are heated until they pass into liquid phase before effecting the premixing.

5. A method according to claim 1 including preparing a rubber mix which comprises a base elastomer and other dosaging additives in a proportion of less than 10% of the total weight of the base elastomer, premixing them so that a paste is obtained, introducing the paste into the mixing chamber into an upstream zone of the chamber, and mixing them in a first mixing zone, and introducing other additives and mixing them in a second premixing zone.

6. A method according to claim 5 in which the formula of the rubber mix introduced into the mixing chamber includes oil to effect the premixing.

7. A method according to claim 5 in which the components of the rubber mix in solid phase at room temperature are heated until they pass into a liquid phase before effecting the premixing.

8. A method as set forth in claim 1 including introducing the base elastomer or elastomers and each other component to the mixing chamber by dosaging and forced introduction means which displace a predetermined volume of material at a controlled rate into the mixing chamber to insure that each component of the rubber composition is present in the mixing chamber in the desired amount relative to the other components.

9. A method of continuously preparing a rubber composition as set forth in claim 1 including controlling the mixing for reducing the size of agglomerate so that the total of agglomerate whose size is above 100 micrometers is lower than the total of agglomerate whose size is under 100 micrometers.

10. A method according to claim 1 including introducing all elastomers into the mixing chamber at a temperature above 40° C.

11. A method according to claim 1 including introducing a plurality of the components into the mixing chamber by forced feeding.

12. A method according to claim 11 in which the force-feeding is by volumetric pumping.

13. A method according to claim 1, including force-feeding a plurality of the components into the mixing chamber by volumetric pumping.

14. A method according to claim 1, including introducing into an upstream zone of the mixing chamber at least a part of the base elastomers and reinforcing fillers in which they are mixed in a first mixing zone and then introducing other of the components of the composition at a point of introduction for mixing in a second mixing zone.

15. A method according to claim 14, including increasing the volume of the material in the mixing chamber between the first mixing zone and the point of introduction of the other of the components.

16. A method according to claim 15, including maintaining a filling rate within the mixing chamber equal to 1 between the first mixing zone and the point of introduction of the other of the components.

17. A method of mixing according to claim 1 in which the mixing chamber is defined between the stator and a single rotor rotating within the stator.

18. A method for continuously mixing a rubber composition in a mixing chamber having an upstream end and a downstream end and including a stator and at least one rotor rotating within the stator and extending between the upstream and the downstream ends, between which the material moves continuously to discharge the rubber composition from the downstream end, and a confined enclosure in communication with the upstream end of the mixing chamber, the method comprising force-feeding by a volumetric pump a predetermined volume of unmixed base elastomer at a controlled rate through the confined enclosure completely filled with base elastomer to impart heat to the base elastomer by mechanical working as it is force-fed from the volumetric pump and through the confined enclosure and introducing at least one filler and other additives to the rubber composition between the upstream and the downstream ends of the mixing chamber.

* * * * *